(12) United States Patent
Moulaire et al.

(10) Patent No.: US 11,345,394 B2
(45) Date of Patent: May 31, 2022

(54) STEER-BY-WIRE POWER STEERING SYSTEM USING ACTUATORS MADE TRANSPARENT THROUGH THE USE OF LOCAL TORQUE AND/OR FORCE CONTROL LOOPS

(71) Applicant: JTEKT EUROPE, Irigny (FR)

(72) Inventors: Pascal Moulaire, La Tour de Salvagny (FR); André Michelis, Chonas l'Amballan (FR)

(73) Assignee: JTEKT EUROPE, Irigny (FR)

(*) Notice: Subject to any disclaimer, the term of this patent is extended or adjusted under 35 U.S.C. 154(b) by 76 days.

(21) Appl. No.: 16/960,785

(22) PCT Filed: Jan. 4, 2019

(86) PCT No.: PCT/FR2019/050013
§ 371 (c)(1),
(2) Date: Jul. 8, 2020

(87) PCT Pub. No.: WO2019/135056
PCT Pub. Date: Jul. 11, 2019

(65) Prior Publication Data
US 2020/0331515 A1    Oct. 22, 2020

(30) Foreign Application Priority Data
Jan. 8, 2018 (FR) ..................... 18/50124

(51) Int. Cl.
*B62D 5/04* (2006.01)
*B62D 5/00* (2006.01)
*B62D 7/18* (2006.01)

(52) U.S. Cl.
CPC ............. *B62D 5/006* (2013.01); *B62D 5/003* (2013.01); *B62D 5/0475* (2013.01); *B62D 7/18* (2013.01)

(58) Field of Classification Search
CPC .......... B62D 5/006; B62D 5/003; B62D 5/32
See application file for complete search history.

(56) References Cited

U.S. PATENT DOCUMENTS 10,358,162 B2 * 7/2019 Kodera ................. B62D 6/007
2004/0113575 A1   6/2004 Matsuoka et al.
(Continued)

FOREIGN PATENT DOCUMENTS

DE        10205632 A1 * 10/2002 ............. B62D 5/001
DE    102006017440 A1 * 10/2007 ............. B62D 6/008
(Continued)

OTHER PUBLICATIONS

Apr. 9, 2019 Search Report issued in International Patent Application No. PCT/FR2019/050013.

*Primary Examiner* — Kevin Hurley
(74) *Attorney, Agent, or Firm* — Oliff PLC (57) ABSTRACT

A steer-by-wire power steering system including a lower-level mechanism that includes a servo motor and a steered wheel, and an upper-level mechanism that includes a steering wheel and an auxiliary motor, the lower-level mechanism being closed-loop controlled, at zero force, by a lower local loop including a feedback branch that measures or estimates an actual downstream force downstream of the servo motor and upstream of the point of contact between the wheel and the ground, so as to make the servo motor transparent, while the upper-level mechanism is closed-loop controlled, at zero torque, by an upper local loop including a feedback branch which measures or estimates an actual driver torque between the auxiliary motor and the steering wheel so as to make the auxiliary motor transparent, the lower and upper local loops being controlled by a single overall controller.

12 Claims, 2 Drawing Sheets

(56) References Cited

U.S. PATENT DOCUMENTS

| | | | |
|---|---|---|---|
| 2009/0078494 | A1 | 3/2009 | Dornhege et al. |
| 2017/0096161 | A1 | 4/2017 | Ko |
| 2018/0312194 | A1* | 11/2018 | Namikawa ........... B62D 5/0478 |
| 2020/0114961 | A1* | 4/2020 | Suzuki ................. B62D 6/008 |

FOREIGN PATENT DOCUMENTS

| | | |
|---|---|---|
| EP | 0 857 638 A2 | 8/1998 |
| EP | 1 184 259 A1 | 3/2002 |
| FR | 2 839 037 A1 | 10/2003 |
| WO | 2016/005671 A1 | 1/2016 |

\* cited by examiner

STEER-BY-WIRE POWER STEERING SYSTEM USING ACTUATORS MADE TRANSPARENT THROUGH THE USE OF LOCAL TORQUE AND/OR FORCE CONTROL LOOPS

The present invention concerns the general field of power steering systems for vehicles.

More particularly, it concerns so-called «steer-by-wire» power steering systems that are free of any mechanical transmission between, on the one hand, an upper-level mechanism comprising a steering wheel and, on the other hand, a lower-level mechanism which comprises an assist motor and which mechanically acts on the steered wheels of the vehicle so as to modify the yaw-orientation (that is to say the steering angle) of said wheels.

In such steer-by-wire systems, it is known to ensure a servo-control in position of the lower-level mechanism, by measuring the angular position of the steering wheel, then by defining and transmitting a corresponding setpoint through an electrical link to the assist motor which drives said lower-level mechanism, and therefore the steered wheels, up to the desired position.

In order to ensure feedback to the steering wheel, so as to enable the driver to perceive the reactions that are induced in the lower-level mechanism by the steering maneuvers and by the contact of the wheels with the road, there is provided, in the upper-level mechanism, a second motor designed so as to rotatably drive the steering wheel.

Nonetheless, the known power steering systems, and in particular the known steer-by-wire steering systems, tend to have some drawbacks.

First of all, some mechanical phenomena related in particular to the inertial mass of the lower-level mechanism or of the upper-level mechanism, or else to the frictions internal to said lower-level mechanism or to said upper-level mechanism, may make the driver feel some heaviness during the maneuvers.

Then, the presence of the steering assistance may render the tactile drive feeling relatively artificial, and in particular not faithfully transmit to the driver some tactile information, called «road feeling», which intuitively inform the driver about the state of the contact between the wheels and the ground, and in particular about the nature of the coating of the road (bitumen, gravel . . . ) and on the degree of adherence of the wheels to the ground.

The feeling may be particularly artificial in the case of a «steer-by-wire» system, when there is no mechanical linkage between the steering wheel and the wheels.

Consequently, the objects assigned to the invention aim at overcoming the aforementioned drawbacks and at providing a new power steering system, in particular a new steer-by-wire steering system, which combines a great maneuvering lightness with a faithful feeling of the drive conditions.

The objects assigned to the invention are achieved by means of a power steering system comprising a first mechanism, called «lower-level mechanism», which comprises an assist motor as well as a steered wheel on which the assist motor acts to orient said steered wheel in yaw, said lower-level mechanism thus defining a lower-level kinematic chain which extends from the assist motor up to a portion of the steered wheel, called «contact portion», intended to come into contact with the ground, so that the forces and the movements originating from the assist motor are transmitted to the steered wheel via and along said actuation kinematic chain, said power steering system also comprising a second mechanism, called «upper-level mechanism», which comprises a steering wheel and which is either free of any mechanical coupling with the lower-level mechanism, so as to form an upper-level kinematic chain that is separate from the actuation kinematic chain, or mechanically coupled to the lower-level mechanism via a coupling member, so as to form, from the steering wheel up to said coupling member, an auxiliary upper-level kinematic chain which forms a bifurcation with respect to the actuation kinematic chain, the power steering system being characterized in that the lower-level mechanism is servo-controlled in force by a closed loop, called «low local loop», which comprises an input branch, called «low loop input branch», allowing defining an input force setpoint, called «low loop input force setpoint», a feedback branch, called «low loop feedback branch», which measures or which estimates, at a reference point, called «low loop reference point», located on the actuation kinematic chain, and outside the control kinematic chain, downstream of the assist motor and upstream of the contact portion of the steered wheel, a force, called «actual downstream force», which is representative, at said reference point, of the force that is transmitted between the assist motor and the steered wheel by the actuation kinematic chain, and in that said low loop feedback branch then applies said actual downstream force in feedback on the low loop input force setpoint, to form a low loop actuation setpoint, which is applied to the assist motor, so that the actual downstream feedback force automatically follows the low loop input force setpoint.

Advantageously, the use of a servo-control local loop, and more particularly a low local loop, which is adapted to servo-control in a closed loop and in a standalone manner the lower-level mechanism, and which includes a feedback branch capable of capturing information, in this instance a force estimate or preferably a force measurement, at a reference point away from the actuator, herein at a reference point away from the assist motor, and therefore the closest to the contact between the wheel and the ground, when considering the lower-level kinematic chain from upstream to downstream, allows rendering the actuator of the concerned mechanism transparent, herein the assist motor which drives the lower-level mechanism, and more generally allows rendering said mechanism transparent.

Transparency herein refers to the capability of a system, herein more particularly the capability of the lower-level mechanism actuated by the assist motor, to start moving, when said system is servo-controlled at zero force (or, respectively, at zero torque), as soon as an external force (or respectively an external torque), even with a very low magnitude, is applied to said system, said system thus «clearing away», without opposing any substantial resistance, by the action of said external force (respectively by the action of said external torque).

Advantageously, such a transparent system can therefore be maneuvered in a responsive manner and without creating a feeling of heaviness.

In particular, the phenomena such as the inertial phenomena or the (dry and/or viscous) friction phenomena that are likely to affect maneuvering of the mechanism but which are «caught in the loop», that is to say which intervene in a portion of the actuation chain that belongs to the servo-control closed loop, and which is herein comprised between the assist motor (included) and the reference point at which the feedback branch collects the force information, have their influence, in practice, divided by the overall gain of the loop, which includes in particular the gain of the feedback branch, and for which it is possible to select a very high value.

Thus, said inertial and friction phenomena that are internal to the mechanism are automatically compensated, and therefore do not impede maneuvering of said mechanism.

Similarly, the external loads, exerted in particular by the road on the wheel, are finely perceived by the lower-level mechanism, which improves the restitution of the «road feelings» to the driver.

Additionally, the implementation of a servo-control in force (or, where appropriate, of a servo-control in torque) advantageously confers high sensitivity, accuracy and responsiveness on the lower-level mechanism, and more generally on the power steering system, to the extent that a servo-control in force monitors, and acts on, forces, that is to say on the causes of the movements, rather than positions, which are the consequence of said movements.

Furthermore, the proposed servo-control in force allows faithfully capturing and retransmitting to the power steering system, and in particular conveying to the steering wheel, all force variations, including the quick variations that could reach a frequency of 20 Hz, 25 Hz, 30 Hz, and even beyond 30 Hz, such as for example the variations of the external forces exerted by the ground on the wheel, such as these variations resulting from a circulation of the vehicle on a gravel-type rough coating.

Hence, this rich frequency content of the actual downstream force signal obtained and used by the steering system allows restituting to the driver a particularly fine and accurate road feeling, which, in particular, enables the driver to obtain a good perception of the nature of the coating of the road.

Finally, the arrangement provided by the invention is advantageously suitable for the management of a steer-by-wire type steering system, within which, as will be detailed later on, the invention allows carrying out separately, on the one hand, a standalone servo-control in force of the lower-level mechanism, by means of a low local loop and, on the other hand, a standalone servo-control in torque of the upper-level mechanism (and therefore of the steering wheel), by means of a top local loop distinct from the low local loop, and completing this architecture with a global controller capable of creating a coupling between said local loops, by generating two input setpoint components, respectively a force setpoint component and a torque setpoint component, respectively intended for the low local loop and for the top local loop.

Thus, the invention allows creating a steer-by-wire steering system where both the upper-level mechanism (and therefore the steering wheel) and the lower-level mechanism actuating the steered wheels react in a transparent way, which confers lightness and accuracy on the maneuvers, while providing an excellent drive feeling as well as a very good feeling of the contact interaction that exists between the wheel and the ground (road feeling).

Other objects, features and advantages of the invention will appear in more detail on reading the following description, as well as using the appended drawings, provided for an illustrative and non-limiting purpose, among which.

The present invention concerns a power steering system 1.

Said power steering system 1 is intended for a vehicle, in particular a motor vehicle, preferably a wheeled motor vehicle comprising at least one steered wheel 12, which preferably may also be a drive wheel.

In a particularly preferred manner, said steered wheel 12 is a front wheel of the vehicle.

Figure 3:
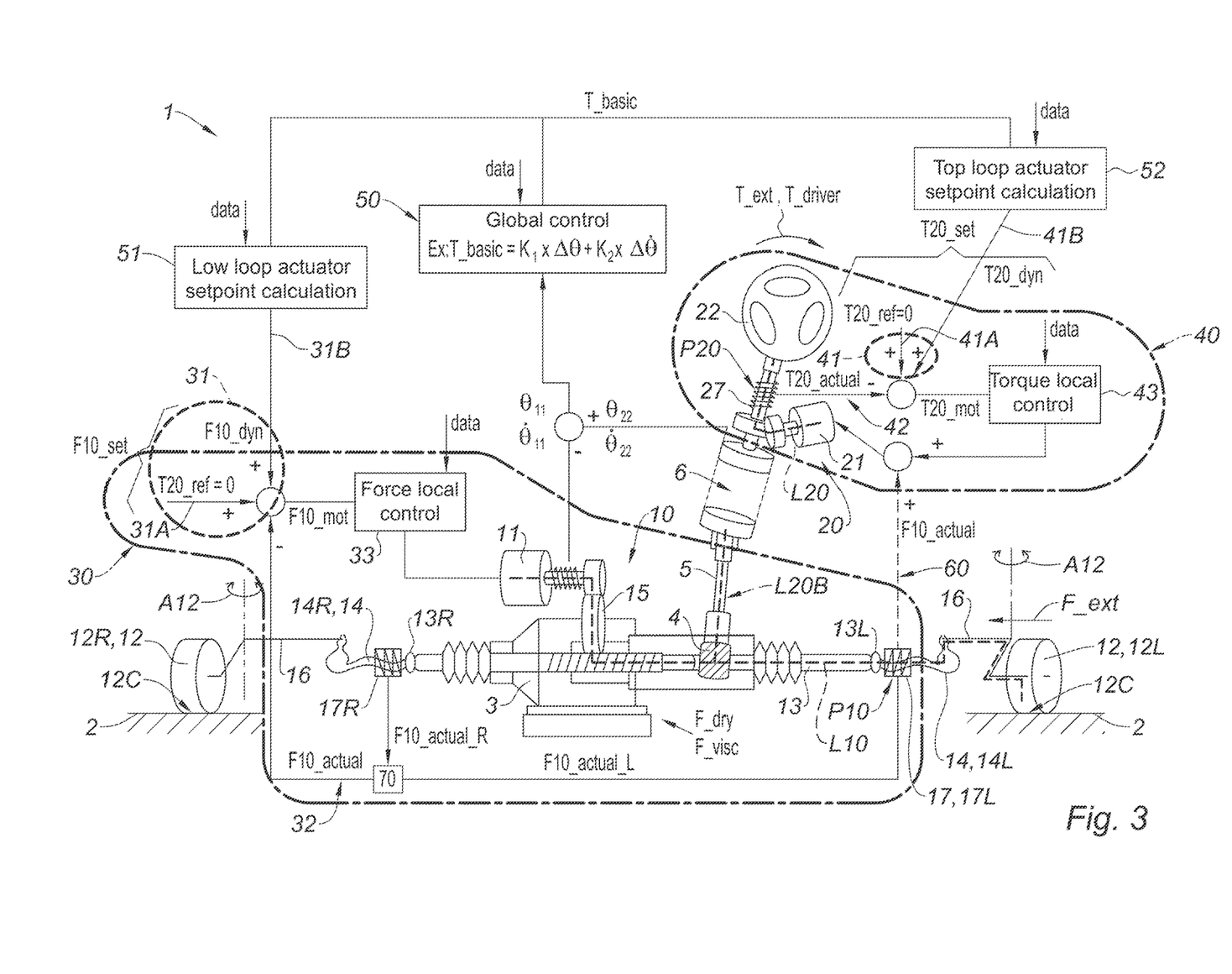
FIG. 3 illustrates, according to a schematic view, an example of a power steering system according to the invention.

As shown in FIG. 3, said power steering system 1 comprises a first mechanism, called «lower-level mechanism», 10 which comprises an assist motor 11 as well as a steered wheel 12 (and more preferably two steered wheels 12, in this instance one left steered wheel 12L and one right steered wheel 12R) on which the assist motor 11 acts to orient said steered wheel 12 in yaw.

Thus, said lower-level mechanism 10 allows imparting a desired steering angle A12 to the steered wheel 12.

In this instance, preferably, the lower-level mechanism thus forms a power mechanism, intended to generate forces that are higher than the manual forces exerted by the driver.

Preferably, the assist motor 11 is an electric motor, for example a brushless motor.

Preferably, it consists of a rotary motor.

The lower-level mechanism 10 defines a lower-level kinematic chain L10 which extends from the assist motor 11 up to a portion 12C of the steered wheel, called «contact portion», 12C intended to come into contact with the ground 2, so that the forces and the movements originating from the assist motor 11 are transmitted to the steered wheel 12 via and along said lower-level kinematic chain L10.

As a preferred example, the lower-level mechanism 10, and more particularly the lower-level kinematic chain L10, may include a rack 13 which is driven by the assist motor 11, and at least one end 13L, 13R of which is coupled to a steering tie-rod 14 which, in turn, transmits the forces and displacements to the steered wheel 12.

Preferably, the rack 13 is mounted and guided in translation according to its longitudinal axis within a steering casing 3 fastened on the vehicle.

The assist motor 11 may engage on said rack 13 through a reducer 15 (or any other suitable mechanical coupling member), for example a gear reducer 15 or a ball-screw reducer 15.

Preferably, the steering tie-rod 14 links the rack 13 to a steering knuckle 16, yaw-orientable, which, in turn, carries the steered wheel 12.

According to a possible embodiment, the lower-level kinematic chain L10 may thus comprise, from upstream to downstream, and as illustrated in FIG. 3: the assist motor 11, a reducer 15 (or any other suitable mechanical coupling member), the rack 13 (or at least the portion of the rack 13 comprised between the reducer 15 and the tie-rod 14), a steering tie-rod 14, the corresponding steering knuckle 16, then the wheel 12 (at least the rim of the wheel 12) carried by said steering knuckle 16.

Conventionally, the lower-level kinematic chain L10 is considered in an ascending direction, oriented from upstream to downstream, when getting away from the actuator, herein the assist motor 11, along said lower-level kinematic chain L10, so as to get close to the effector which interacts with the outside environment of the considered mechanism 10, that is to say herein so as to get close to the contact portion 12C of the steered wheel 12.

Thus, the assist motor 11 preferably forms the upstream end of the lower-level kinematic chain L10, and the contact portion 12C of the wheel 12 forms the downstream end of said lower-level kinematic chain L10.

Alternatively, without departing from the scope of the invention, it is of course possible to consider a shorter lower-level kinematic chain L10, for example in which an assist motor 11 could directly act on the steering knuckle 16, possibly via a reducer 15, but without passing through a rack 13, and preferably without passing neither through a rack 13 nor through a steering tie-rod 14.

According to such a variant, a given assist motor 11 can control, individually and directly, the yaw-orientation of one single steered wheel 12, via the steering knuckle 16.

Still according to such a variant, but which would comprise (at least) two steered wheels 12, typically two front steered wheels, it is possible to associate one distinct assist motor 11 to each of said steered wheels 12, that is to say provide for two distinct assist motors 11 each would individually control the yaw-orientation of the concerned steered wheel 12.

Nonetheless, for convenience of the description, reference will preferably be made to a power steering system 1 in which the lower-level mechanism 10 comprises a rack 13, which allows actuating two steering tie-rods 14 respectively connected to each of the ends 13L, 13R of said rack and each associated to a steering knuckle 16 and to a wheel 12.

As shown in FIG. 3, the power steering system 1 also comprises a second mechanism, called «upper-level mechanism», 20.

This upper-level mechanism 20 comprises a steering wheel 22.

The steering wheel 22 enables a driver to pilot the power steering system 1 and control the desired steering angle A12.

The steering wheel 22 also enables a driver to touchably feel the reactions of the power steering system 1, and thus intuitively deduct information («road feeling») about the environment of the vehicle, and more particularly information regarding the nature of the ground 2 on which the vehicle circulates and regarding the adherence condition of the wheels 12 on the ground 2.

Of course, for convenience, reference is made to a «steering wheel» 22, bearing in mind that it is possible to use, for the same purposes, any suitable maneuvering device, other than a steering wheel, such as for example a joystick.

Herein, preferably, the upper-level mechanism 20 therefore corresponds to a control mechanism (in contrast with the lower-level mechanism which forms the power mechanism).

According to a possible implementation, the upper-level mechanism 20 may be free of any mechanical coupling with the lower-level mechanism 10, so as to form an upper-level kinematic chain L20 which is separate from the lower-level kinematic chain L10.

In this respect, in a particularly preferred manner, the power steering system 1 forms a «steer-by-wire» configured power steering system, which is free of any mechanical coupling between the upper-level mechanism 20 and the lower-level mechanism 10.

In such a steer-by-wire system, the steering wheel 22 does not engage on the lower-level mechanism 20.

The link between the steering wheel 22 and the wheels 12, and more generally the functional link between the upper-level mechanism 20 and the lower-level mechanism 10, that is to say the link that allows correlating the position of the steering wheel 22 as well as the tactile feelings restituted through said steering wheel 22 with the actual position of the wheels 12 (position of the lower-level mechanism 10) and with the forces that are exerted on said wheels 12 and in the lower-level mechanism 10, is therefore achieved (exclusively) in a virtual manner, by electric signals.

Alternatively, the upper-level mechanism 20 may, on the contrary, be mechanically coupled to the lower-level mechanism 10 via a coupling member 4 so as to form, from the steering wheel 22 up to said coupling member 4, an auxiliary upper-level kinematic chain L20 which forms a bifurcation L20B with respect to the lower-level kinematic chain L10.

For example, the coupling member 4 may be in the form of a pinion 4 which meshes on the rack 13 and which is fastened to a steering column 5 driven by the steering wheel 22.

According to a possible embodiment, it may be considered to use a clutch device 6 which selectively allows mechanically coupling or mechanically separating the lower-level mechanism 10 to/from the upper-level mechanism 20, so as to be able to choose to configure the power steering system 1 either in steer-by-wire (the device 6 being in a declutched state) or in mechanical coupling (the device 6 being in a clutched state).

In particular, it is possible to provide for a power steering system 1 arranged so as to normally operate in steer-by-wire, but nevertheless having, as a backup device, a coupling member 4 arranged so as to mechanically connect the upper-level mechanism 20 again to the lower-level mechanism 10, and more particularly to connect the steering wheel 22 again to the steering column 5 and (especially) to the rack 13, in the event of failure of the steer-by-wire operation.

Conversely, as indicated hereinabove, it is possible to provide for a «pure» steer-by-wore power steering system 1, completely free of any coupling member 4 (and of any steering column 5 engaged on the rack 13).

According to the invention, the lower-level mechanism 10 is servo-controlled in force by a closed loop, called «low local loop» 30.

For convenience of the description, it is possible to refer to the set formed by the lower-level mechanism 10 and the low local loop 30 piloting it as «lower-level subsystem».

Advantageously, the selection of a servo-control in force, or, in an equivalent manner, in torque, allows regulating the actuation of the lower-level mechanism 10 by targeting a desired stress state at a reference point P10 of said lower-level mechanism 10, that is to say by targeting a magnitude of the force transmitted through the lower-level kinematic chain L10 at said reference point P10.

Such a servo-control in force allows detecting and managing the forces that are exerted on the lower-level mechanism 10, and more particularly the external forces that result from the reactions of the ground 2 against the wheels 12 and which are transmitted through said lower-level mechanism 10, along the lower-level kinematic chain L10.

As indicated hereinabove, by having the servo-control based on the forces, that is to say on the causes, which can be immediately perceived in real-time, of the movements of the lower-level mechanism 10, rather than the displacements (variations of positions), which are the consequences of the application of the forces and which can be perceived only later on, with a delay that is necessary for the completion of a movement with a sufficient amplitude, a servo-control with particularly quick and accurate reactions is advantageously obtained.

Furthermore, such a servo-control type allows rendering the actuator of the lower-level mechanism 10 transparent, namely the assist motor 11, and more generally the lower-level mechanism 10, as will be detailed later on.

The low local loop 30 comprises an input branch, called «low loop input branch», 31 which allows defining an input force setpoint, called «low loop input force setpoint», F10_set.

Said low local loop 30 also comprises a feedback branch, called «low loop feedback branch», 32 which measures or which estimates, at a reference point, called «low loop reference point», P10, a force, called «actual downstream force», F10_actual.

The actual downstream force F10_actual is representative, at said reference point P10, of the force that is transmitted between the assist motor 11 and the steered wheel 12 (or vice versa, of the force that is transmitted from the wheel 12 towards the assist motor 11) through the lower-level kinematic chain L10.

In practice, this actual downstream force F10_actual corresponds to the force that is supplied, at the considered time, by the lower-level mechanism 10 to counter (and in particular to balance, in a situation where a given steering angle A12 is maintained, and even to surpass, in a situation where the steering angle A12 is modified) the resisting force, denoted «external force» F_ext, that is exerted by the environment of the vehicle, and in particular by the ground 2, on said lower-level mechanism 10.

In practice, said external force F_ext is essentially caused by the contact between the contact portion 12C of the wheel 12 and the ground 2, or by the contact of said wheel 12 with an obstacle present in the environment of the wheel 12.

Typically, the actual downstream force F10_actual may correspond to the tensile force, or respectively the compressive force, that is exerted by the concerned steering tie-rod 14 on the end 13L, 13R of the rack to which said tie-rod 14 is connected.

Preferably, the actual downstream force F10_actual is measured, by means of a suitable force sensor 17 placed at the low loop reference point P10.

For example, said force sensor 17 may comprise a strain gauge, or else a photoelasticimetry optical sensor.

Preferably, as illustrated in FIG. 3, it is possible to use two force sensors 17L, 17R, namely a first left force sensor 17L, allowing measuring the force that is exerted by the left steering tie-rod 14L (connected to the left steered wheel 12L) on the left end 13L of the rack 13, and a second right force sensor 17R, allowing measuring the force that is exerted by the right steering tie-rod 14R (connected to the right steered wheel 12R) on the opposite right end 13R of the rack 13.

In such a configuration, the actual downstream force F10_actual may advantageously be determined, with a better accuracy, by means of an actual downstream force calculation unit 70, from the two measurements carried out simultaneously on each of the two force sensors 17L, 17R.

As example, the actual downstream force F10_actual may be considered as the sum or the difference (depending on the sign of the captured information) of the value of the force F10_actual_L measured by the left force sensor 17L and of the value of the force F10_actual_R measured by the right force sensor 17R.

It should be noted that said left F10_actual_L and right F10_actual_R forces are supposed to have opposite signs, because one of the tie-rods (the left tie-rod 14L when the power steering system 1 is steered to the left) works in compression, whereas the other tie-rod (the right tie-rod, during a steering to the left) works in tension.

According to a variant of implementation of the invention, it is possible to use, instead of a measurement of the actual downstream force F10_actual carried out by a force sensor 17, an estimate of said actual downstream force F10_actual, provided by a suitable algorithm, designed so as to provide a realistic estimate of said actual downstream force at the considered reference point P10.

Such an algorithm allows estimating, virtually, the force at the low loop reference point P10, from data other than a force measurement that would have been taken at said reference point 10. Where appropriate, the power steering system 1 may thus be free of any force sensor 17 at the low loop reference point P10.

As example, if the used low loop reference point P10 is located at the end 13L of the rack 13 and/or at the level of the steering tie-rod 14, then it is possible to use, to this end, an «algorithm for force estimation at the tie-rods» such as that described in the application WO-2016/005671 filed by the Applicant.

That being so, a physical measurement through the use of a force sensor 17, or several force sensors 17 (preferably two force sensors 17L, 17R, one sensor on each side of the rack 13), may be preferred rather than a virtual estimate through an algorithm, and that in order to obtain better performances of the system according to the invention.

Moreover, whether the actual downstream force P10_actual is measured by means of a sensor 17 or assessed by means of a proper algorithm, the low loop reference point P10 is located on the lower-level kinematic chain L10, and outside the upper-level kinematic chain L20, downstream of the assist motor 11 and upstream of the contact portion 12C of the steered wheel 12.

Indeed, the reference point P10 should be selected such that the actual downstream force P10_set that is assessed therein is actually representative of the force that is applied to the wheel 12 through the lower-level kinematic chain L10.

In practice, to obtain a realistic estimate of said force as well as to improve the transparency of the lower-level mechanism 10, it is preferable to place the low loop reference point P10 as far downstream as possible along the lower-level kinematic chain L10, the farthest from the actuator (the assist motor 11), and the closest to the wheel 12, and more particularly the closest to the contact area 12C, that is to say the closest to the area, herein the (downstream) terminal area of the lower-level kinematic chain L10, where the outside environment of the vehicle exerts an external force F_ext against the lower-level mechanism 10.

Thus, it is possible to include in the low local loop 30, to serve as the effector branch that executes a force setpoint, a portion of the lower-level kinematic chain L10 that is as long possible.

In this instance, the portion of the lower-level kinematic chain L10 which is thereby integrated to the low local loop 30, that is to say «caught in the loop», extends from the assist motor 11, which forms an upstream input point at the level of which it is possible to adjuster and apply to the actuator (the assist motor 11) a force setpoint F10_set, F10_mot, up to the downstream reference point P10 which forms an output point of the loop, located downstream of the assist motor and of a portion of the effector members (in particular of the rack 13) which are driven by said assist motor 11.

At the level of the reference point P10, the actual effect produced on the tie-rod 14 and on the wheel 12 is monitored through the execution of the force setpoint F10_set, F10_mot by the assist motor 11.

More generally, at the level of the reference point P10, the effect produced by the combined actions of the actuator (the assist motor 11) and of the environment of the system 1 on the elements of the lower-level kinematic chain L10 that are external to the low local loop 30, as they are located downstream of the reference point P10, beyond the portion of the lower-level kinematic chain L10 which is included in the low local loop 30, is monitored.

Preferably, and in particular if the lower-level kinematic chain L10 passes through an intermediate member between the assist motor 11 and the steering knuckle 16, for example through a rack 13, the low loop reference point P10, and more particularly the force sensor 17 used by the feedback branch 32, is distinct, and physically remote, from a possible torque sensor that would be integrated to the shaft of the assist motor 11.

Similarly, the low loop reference point P10, and more particularly the force sensor 17 used by the feedback branch 32, is distinct, and physically away, from a possible steering wheel torque sensor 27 that would be associated to the steering wheel 22, on a steering column carrying said steering wheel, and which would be specifically intended to measure the torque T_driver exerted by the driver on the steering wheel 22.

According to the invention, the low loop feedback branch 32 then applies the actual downstream force F10_actual in feedback on the low loop input force setpoint F10_set, so as to form a low loop actuation setpoint F10_mot, which is applied to the assist motor 11, so that the actual downstream feedback force F10_actual automatically follows the low loop input force setpoint F10_set.

Thus, referring to FIG. 3, we preferably have:

$$F10\_mot = F10\_set - F10\_actual$$

the signs + (positive) and − (negative) are herein selected merely by convention to indicate the corrective effect of the feedback branch 32.

As illustrated in FIG. 3, a low loop local controller 33 translates the low loop actuation setpoint F10_mot into a current setpoint applied to the assist motor 11.

Preferably, the low loop local controller 33 uses, to this end, a law or a map which may also depend on parameters related to the vehicle, such as the longitudinal speed, the lateral acceleration, the yaw speed of said vehicle, etc.

Said law or map may also depend on parameters specific to the power steering system 1, and in particular parameters specific to the lower-level subsystem 10, 30, such as for example the rotational speed of the assist motor 11, the torque generated by the assist motor 11, the inertial masses of all or part of the components of the lower-level mechanism 10, etc.

These parameters (related to the vehicle and/or to the power steering system) are denoted «data» on the concerned inputs of the power steering system 1 represented in FIG. 3.

For example, said parameters «data» may be made available to the power steering system 1, through the on-board computer network, by other on-board system on the vehicle, such as a for example an electronic stability program (ESP) or an anti-lock braking system (ABS).

Preferably, and according to a feature which may constitute an invention on its own, when considering a power steering system 1 comprising a closed low local loop 30, the low local loop 30 comprises a sub-branch 31A of the low loop input branch 31, sub-branch 31A which introduces a low loop input reference F10_ref which represents an input force setpoint with a zero value, so as to be able to servo-control the low local loop 30 at zero force:

$$F10\_ref = 0$$

This input reference F10_ref with a zero value, preferably constant, allows conferring a high transparency on the lower-level mechanism 10, and more particularly on the lower-level kinematic chain portion L10 that is caught in the low local loop 30.

Indeed, when the lower-level mechanism 10 is initially in an equilibrium state, and the external force F_ext which acts on the wheel 12, and more generally which acts on the portion of the lower-level kinematic chain L10 that is not included in the low local loop 30, is modified, for example because the wheel 12 hits an obstacle present on the ground 2, then the modification of said external force F_ext causes a modification, at the reference point P10, of the value of the actual downstream force F10_actual, which consequently gets away from the input force setpoint F10_set in effect at the considered time.

The assist motor 11, automatically regulated, in a stand-alone manner, by the low local loop 30, then instantaneously corrects its action, thanks to the feedback branch 32 which modifies the actuation setpoint F10_mot by reflecting thereto the modification of the actual downstream force F10_actual, such that said assist motor 11, and more generally the portion of the lower-level mechanism 10 comprised in the low local loop 30, clears away, without opposing any resistance, by the action of the external force F_ext, in order to absorb the variation of magnitude of said external force F_exet, and thereby cause a return of the actual downstream force F10_actual to the value of the desired input force setpoint F10_set.

Advantageously, in the absence of another (non-zero) force setpoint component at the input 31 of the low loop 30, the low loop input reference F_ref, herein with a zero value, applies by default.

In such a case, the assist motor 31 is therefore servo-controlled so as to maintain the actual downstream force F10_actual at a zero, or substantially zero, value.

Thus, when an external force F_ext tends to cause the apparition of a non-zero actual downstream force, the feedback branch 32 immediately detects and transmits this variation of the actual downstream force F10_actual in order to generate an actuation setpoint F_mot which, when applied to the assist motor 11, enables the latter to act on the lower-level mechanism 10 so as to absorb the effect of the external force F_ext, in order to bring the actual downstream force F10_actual back to zero.

In practice, the assist motor 11 therefore reacts so as not to oppose any resistance to the variations of the external force F_ext, but on the contrary so as to accompany the variations of the external force F_ext in order to avoid the apparition of stresses, and in this instance in order to avoid the apparition or the maintenance of a non-zero actual downstream force F10_actual.

Hence, the lower-level mechanism 10 spontaneously starts moving in the direction desired by the external force F_ext, as soon as an external force F_ext, however small, is applied thereto.

A similar principle applies when, in addition to the input reference F10_ref, with a zero value, the low loop input setpoint F10_set also takes into consideration, by means of a second sub-branch 31B of the input branch 31, a component of the force setpoint, called «low loop force setpoint dynamic component», F10_dyn which typically allows reflecting the maneuver intent of the driver, and more particularly the action of the driver on the steering wheel 22.

Herein again, when a variation of the external force F_ext occurs, which temporarily brings the actual downstream force F10_actual away from the input force setpoint value F10_set, which is equal, at equilibrium, to the dynamic component F10_dyn (which may be constant at the considered time), then the feedback branch 32 allows modifying the actuation setpoint F10_mot so that the assist motor 11 makes the lower-level mechanism 10 clear away, and makes the actual downstream force F10_actual return back to the dynamic component value F10_dyn.

Thus, said assist motor 11 does not oppose any resistance to the displacement of the lower-level mechanism 10 that is necessary and sufficient to absorb the variation of the external force F_ext, which therefore allows maintaining the difference between the actual downstream force F10_actual and the input force setpoint F10_set, that is to say herein between the actual downstream force F10_actual and the force setpoint dynamic component F10_dyn, at a substantially zero value.

In any case, the low local loop 30 servo-controlled at zero force therefore allows correcting in real-time, with a high responsiveness, the action of the assist motor 11, so that said assist motor 11 opposes almost no resistance to the displacements of the lower-level mechanism 10 induced by the variations of the external force F_ext, and therefore promotes clearance of said lower-level mechanism 10 by the effect of the variations of the external force F_ext.

This self-regulation confers high transparency on the lower-level mechanism 10, which, in particular, enables said lower-level mechanism 10 to react to all variations of the external force F_ext, and therefore to be sensitive to, and to restitute in a quite noticeable and identifiable manner, the interaction between the wheels 12 and the ground which characterizes the «road feeling».

This same self-regulation at zero force also enables the driver to maneuver the power steering system 1 without any effort, and in particular without being disturbed by the inertia of the lower-level mechanism or by the internal frictions that arise in the portion of the lower-level mechanism 10 included in the low local loop 30.

Figure 1:
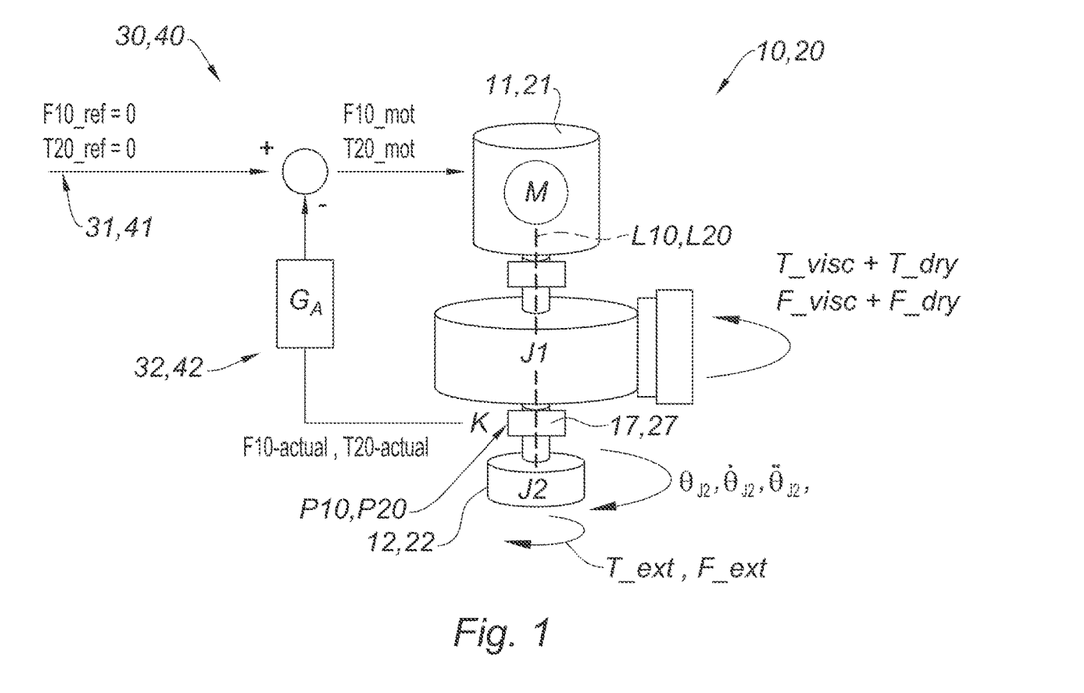
FIG. 1 illustrates, according to a schematic view, the principle of transparency of a mechanism piloted by a local loop servo-controlled at zero force (or, in an equivalent manner, at zero torque).

For convenience of the representation, the frictions, and in particular the dry frictions (Coulomb friction) F_dry, T_dry and the viscous frictions F_visc, T_visc (proportional to the speed of displacement of the considered mechanism 10, and more particularly proportional to the speed of displacement of the rack 13), are symbolized by a friction pad in FIGS. 1 and 3.

It should be noted that, according to one variant, it could be possible to set the low loop input reference F10_ref at a non-zero offset value so as to introduce a corrective effect in the low loop input setpoint F10_set.

For a better understanding of the invention, the concept of «transparency» will be described in more detail, with reference to FIGS. 1 and 2.

Figure 2:
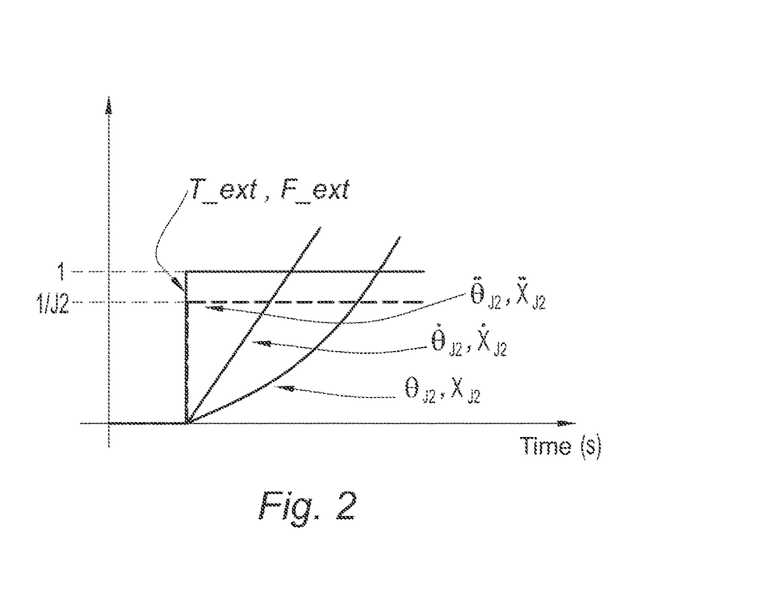
FIG. 2 illustrates, according to a schematic view, the response in force (or in torque) and therefore in acceleration, as well as the responses in speed of displacement and in position, of the transparent mechanism of FIG. 1.

According to the invention, said transparency concept illustrated in the generic FIGS. 1 and 2 is advantageously applied (or applicable) to the lower-level mechanism 10 actuated by the assist motor 11, or to the upper-level mechanism 20, or, preferably, to each of these two mechanisms 10, 20.

For convenience, reference will therefore be made to the constituent elements of said mechanisms 10, 20.

FIG. 1 schematizes a mechanism 10, 2, driven by an actuator, symbolized by a motor 11, 21.

Said mechanism 10, 20 is servo-controlled by a closed loop, called «local loop», 30, 40.

The servo-control is carried out in force (identified by the letter «F»), or, in an equivalent manner, in torque (identified by the letter, «T»).

To this end, the local loop 30, 40 comprises an input branch 31, 41, to define an input setpoint (force setpoint or, respectively, torque setpoint), as well as a feedback branch 32, 42.

The input branch 31, 41 herein allows defining an input reference F10_ref, T20_ref, representative of a zero force (respectively of a zero torque), for a servo-control at zero force (respectively at zero torque).

The feedback branch 32, 42 assesses (for example by means of a proper algorithm), or preferably measures, for example by means of a suitable force sensor 17 (respectively a torque sensor 27), the actual force F10_actual (respectively the actual torque T20_actual), at a reference point P10, P20 of the mechanism 10, 20.

The gain that is applied by the force sensor 17 (respectively the torque sensor 27), or by the assessment algorithm, is denoted «K».

The reference point P10, P20 is located downstream of the actuator (motor) 11, 21 along the kinematic chain L10, L20 that links said actuator 11, 21 to an effector 12, 22, herein typically a steered wheel 12 or a steering wheel 22.

The effector 12, 22 forms a (terminal) interface of the mechanism 10, 20 with the outside environment of said mechanism 10, 20, through which interface the outside environment, herein typically the ground 2 or respectively the driver of the vehicle, can exerts an external force F_ext, respectively an external torque T_ext, on said mechanism 10, 20, against the actuator (motor) 11, 21.

The mass, or, in an equivalent manner, the moment of inertia, of the portion of the mechanism 10, 20 that is comprised in the local loop 30, 40, that is to say of the upstream portion of the kinematic chain L10, L20 that extends from the actuator (motor) 11, 21 up to the reference point P10, P20, is denoted J1.

The mass, or, in an equivalent manner, the moment of inertia, of the (remaining) portion of the mechanism 10, 20 that is located outside the local loop 30, 40, that is to say the downstream portion of the kinematic chain L10, L20 that extends from the reference point P10, P20 up to the (terminal) interface of the mechanism 10, 20 with the outside environment, and more particularly up to the contact area with the effector 12,22 and the outside environment (ground 2, respectively the driver), is denoted J2.

The overall gain of the local loop 30, 40 is denoted $G_A$.

For simplicity, said overall gain $G_A$ is herein represented in the form of a unique transfer function placed on the feedback branch 32, 42.

The angular position, the angular speed, and the angular acceleration of the effector 12, 22, herein more particularly of the steering wheel 22, when the movement of the effector 12, 22 refers to a rotational movement are respectively denoted $\theta_{J2}$, $\dot{\theta}_{J2}$ and $\ddot{\theta}_{J2}$.

Similarly, referring to a translational movement, the linear position, the linear speed, and the linear acceleration of the effector 12, 22, will be respectively denoted $X_{J2}$, $\dot{X}_{J2}$ and $\ddot{X}_{J2}$.

It should be highlighted that, in the case where the lower-level mechanism 10 includes a rack 13, the position, the speed and the acceleration of the rack 13 may advantageously be considered, in particular while accounting for the (relative) stiffness of the rack 13 and of the kinematic chain portion L10 that links said rack 13 to the steering knuckle 16, as representative of the position, of the speed and of the acceleration of the downstream portion of the lower-level mechanism 10, which includes the tie-rod 14, the steering knuckle 16, and the wheel 12.

The force, respectively the torque, of the viscous friction (proportional to the speed of displacement of the considered mechanical member) that is exerted on the (upstream) portion of the mechanism 10, 20 that is comprised in the local loop 30, 40, is denoted F_visc, respectively T_visc.

The force, respectively the torque, of the dry friction that is exerted on the (upstream) portion of the mechanism 10, 20 that is comprised in the local loop 30, 40, is denoted F_dry, respectively T_dry.

We consider $R_1 = T\_visc + T\_sec$

«s» represents Laplace's variable.

Referring to the diagram of FIG. 1, we then obtain the following expression:

$$T_{Ext} = J2 \cdot \theta_{J2} \cdot s^2 + \frac{\frac{R_1}{(1+G_A)} \cdot (J1/R_1 \cdot s + 1) \cdot \theta_{J2} \cdot s}{\left(\frac{J1}{K(1+G_A)} \cdot s^2 + \frac{R_1}{K(1+G_A)} \cdot s + 1\right)}$$

If a sufficiently high overall gain GA, or an overall gain approaching infinity, is selected, it is then possible to simplify the expression hereinabove and thus obtain, in a first approximation:

$$\frac{G_A^{\Rightarrow \infty}}{T_{Ext}} = J2 \cdot \ddot{\theta}_{J2} \Rightarrow \theta_{J2} = \frac{T_{Ext}}{J2 \cdot s^2}$$

Thus, the reaction of the mechanism 10, 20 to the application of an external force F_ext, T_ext, and more particularly the displacement of the (downstream) portion of the mechanism 10, 20 that is located outside the local loop 30, 40, depends only on the inertia J2 of said downstream portion external to the local loop 30, 40.

The upstream portion of the mechanism 10, 20, which extends from the actuator (motor) 11, 21 up to the reference point P10, P20, and therefore rendered transparent, as it does not oppose any resistance to the movement against the variations of the external force F_ext, T_ext.

Advantageously, as illustrated in FIG. 2, the transparency enables the mechanism 10, 20 to immediately react, by a spontaneous displacement, to the application of an external force F_ext, T_ext.

In particular, an external force step F_ext, T_ext will translate, without any delay, into an acceleration step, directly proportional (according to the multiplicative inverse of the inertial mass J2) to the external force step F_ext, T_ext.

Consequently, a speed ramp, and a position modification quadratic curve will be obtained, also without any delay.

Furthermore, the formula simplification presented hereinabove allows eliminating the expression R1 from the equation, that is to say automatically compensate for the effects of the frictions F_dry, T_dry, F_visc, T_visc that are internal to the portion of the mechanism 10, 20 that is included in the local loop 30, 40, and therefore render said frictions unnoticeable.

When considering the application of this transparency principle to the low local loop 30 and to the lower-level mechanism 10 actuated by the assist motor 11, we obtain:

$$\ddot{X}_{rack} = \frac{F_{Ext}}{J_{rod}} \Rightarrow X_{rack} = \frac{F_{Ext}}{J_{rod} \cdot s^2}$$

Where:

X_rack refers to the position of the rack 13 (herein the linear position in translation along the steering casing 3);

J_rod represents the inertial mass of the portion of the lower-level mechanism 10 located downstream of the reference point P10, and more particularly the inertial mass of the portion of the lower-level mechanism 10 that is located downstream of the force sensor 17. Typically, J_rod may thus represent the inertial mass of the subassembly formed by the tie-rod 14, the steering knuckle 16 and the wheel 12.

In a similar manner, when considering the application of the transparency to a top local loop 40 which servo-controls in torque, through a closed loop, an upper-level mechanism 20 which comprises, in addition to the steering wheel 22, an auxiliary motor 21 arranged so as to actuate the upper-level mechanism 20 in order to restitute to the steering wheel 22 the forces that are representative of the reactions of the lower-level mechanism, we obtain:

$$\ddot{\theta}_{SW} = \frac{T_{driver}}{J_{SW}} \Rightarrow \theta_{SW} = \frac{T_{driver}}{J_{SW} \cdot s^2}$$

Where:

$\theta_{SW}$ refers to the angular position of the steering wheel 22;

T_driver refers to the external torque T_ext that is exerted by the driver on the steering wheel 22;

$J_{SW}$ refers to the moment of inertia of the portion of the upper-level mechanism 20 that is located downstream of the reference point P20, and which comprises in this instance the steering wheel 22, and where appropriate a steering column portion on which said steering wheel 22 is mounted.

It should also be noted that the smaller the inertial mass J2 of the downstream portion of the mechanism 10, 20 that is not comprised in the local loop 30, 40, the lower will be the resistance of the mechanism 10, 20 to the movement, and therefore the better will be the reaction of the mechanism 10, 20 to the application of an external force F_ext, T_ext, that is to say the higher will be the sensitivity of the mechanism 10, 20, and therefore the better will be the capability of the system 1 to restitute a better road-feeling.

In order to minimize said inertial mass J2, we will seek, as already mentioned hereinabove, to include the largest possible portion of the mechanism 10, 20 in the local loop 30, 40, and therefore to place the reference point P10, P20 of the feedback branch 32, 42 as far downstream as possible of the corresponding kinematic chain L10, L20, in order to include the longest possible portion of said kinematic chain L10, L20 in the local loop 30, 40.

Hence, we will seek a proper positioning of the reference point P10, P20, and more particularly of the force and/or torque sensor 17, 27, downstream of the motor 11, 21.

In the case of the lower-level mechanism 10, we will thus seek to place the low loop reference point P10 downstream of the assist motor, 11, and preferably, if said mechanism 10 includes a member 4 for coupling to the upper-level kinematic chain L20, L20B, downstream of said coupling member 4 (downstream of the bifurcation between the lower-level kinematic chain and the upper-level kinematic chain), the closest to the contact area 12C between the wheel 12 and the ground 2, along the lower-level kinematic chain L10.

Thus, if, preferably, the lower-level kinematic chain L10 comprises a rack 13 driven by the assist motor 11, and at least one end 13L, 13R of which is coupled to a steering tie-rod 14 which, in turn, transmits the forces and displacements to the steered wheel 12, then the low loop reference point P10, at which the actual downstream force F10_actual is measured or estimated, is preferably located downstream of the rack 13 in the direction of said steered wheel 12, for example at the junction between the end 13L of the rack and the steering tie-rod 14, on the steering tie-rod 14, or downstream of the steering tie-rod 14.

As indicated hereinabove, said low loop reference point P10 corresponds, if an algorithm enabling a virtual estimate is selected, at the point at the level of which said algorithm estimates the actual downstream force F10_actual.

If said force is physically measured by means of a force sensor 17, then said reference point P10 corresponds to the physical location of said force sensor 17.

Incidentally, whether the lower-level mechanism 10 includes a rack 13 and/or one (or several) tie-rod(s) 14 or not, if the lower-level kinematic chain L10 comprises a steering knuckle 16 which carries the steered wheel 12, then the low loop reference point P10 at which the actual downstream force F10_actual is measured or estimated, may advantageously be located on said steering knuckle 16.

The steering knuckle 16 materializes the axis of orientation, herein the yaw axis, of said steered wheel 12, according to which the steering angle of said wheel 12 can be modified.

According to another possibility, it is possible to consider placing the low loop reference point P10 on the wheel 12 itself, for example on the wheel rim, and even at the level of the tire of said wheel 12, he closest to the rolling tread of said tire, and therefore the closest to the contact area 12C with the ground 2.

According to a preferred feature which may constitute an invention on its own, and in particular whether the lower-level mechanism 10 is servo-controlled by a closed local low loop 30 as described hereinabove or not, the upper-level mechanism 20 comprises an auxiliary motor 21, in addition to the steering wheel 22.

Said auxiliary motor 21 is distinct from the assist motor 11 of the lower-level mechanism 10.

In particular, such a separation allows creating a servo-control loop 40 that is specific to the upper-level mechanism 20, distinct from the low local loop 30 and, where appropriate, making a «steer-by-wire» steering system.

Preferably, as illustrated in FIG. 3, the upper-level mechanism 20 may be servo-controlled in torque by a closed loop, called «top local loop» 40.

For convenience of the description, it is possible to refer to the set formed by the upper-level mechanism 2 and the low local loop 40 piloting it as «upper-level subsystem».

As indicated hereinabove in particular with reference to the low local loop 30, a servo-control in torque (like a servo-control in force) allows conferring responsiveness and transparency on the upper-level mechanism 20.

Thus, the steering wheel 22 will be light to maneuver, since it will oppose almost no «parasitic» intrinsic resistance to the external torque Text=T_driver exerted by the driver (in particular no resistance related to the friction T_visc, T_dry internal to the upper-level mechanism 20 or to proper inertial mass of said upper-level mechanism 20), while being capable of finely and accurately transmitting road feelings to the driver.

The top local loop 40 comprises an input branch, called «top loop input branch», 41 which allows defining an input torque setpoint, called «top loop input torque setpoint», T20_set.

Said top local loop 40 also comprises a feedback branch, called «top loop feedback branch», 42 which measures or which estimates, at a reference point, called «top loop reference point», P20 located between the auxiliary motor 21 and the steering wheel 22 (and more particularly downstream of the auxiliary motor 21 and upstream of the steering wheel 22), a torque, called «actual driver torque», T20_actual which is representative, at said reference point P20, of the torque T_driver exerted by the driver, via the steering wheel 22, on the upper-level mechanism 20.

In practice, it is possible to consider that T20_actual=T_driver, and that T_driver is non-zero, for example when the driver actively acts on the steering wheel to reach or maintain a desired steering angle, or else T_driver is zero, typically when the vehicle travels in a straight line.

Preferably, the top loop reference point P20 is located in the immediate vicinity of the steering wheel 22, for example on a steering column portion that carries said steering wheel 22.

Herein again, it is possible to consider using a steering wheel torque estimation algorithm to virtually estimate the actual driver torque T20_actual, from other parameters.

Nonetheless, preferably, the actual driver torque T20_actual will be measured by a suitable torque sensor 27, for example a torque electromagnetic sensor which measures the deformations of a torsion bar placed on the steering column.

The location of said torque sensor 27 will physically correspond to the top loop reference point P20.

It should be highlighted that the top loop reference point P20 is distinct from the low loop reference point P10, and that, where appropriate, the force sensor 17 used in the low local loop 30 is therefore distinct and remote from the torque sensor 27 used in the top local loop 40.

More generally, the top local loop 40 and the low local loop 30 are thus well separated, so as to be able to operate independently of one another, and in particular so as to be able to servo-control, each on its own, their respective actuator (motor) 11, 21 in a standalone manner.

Advantageously, after having estimated or measured the actual driver torque T20_actual, the top loop feedback branch 42 then applies said actual driver torque T20_acutal in feedback on the top loop input force setpoint T20_set, so as to form a top loop actuation setpoint T20_mot which is applied to the auxiliary motor 21 so that the actual driver torque T20_acutal (and therefore the driver torque T_driver) automatically follows the top loop input torque setpoint T20_set.

It should be highlighted that the characteristics, the operation, and the advantages of the top local loop 40 may advantageously be deducted mutatis mutandis from those described with reference to the low local loop 30.

Indeed, we find in the top local loop 40 functions and advantages that are similar to those of the low local loop 30.

Thus, referring to FIG. 3, we preferably have:

$$T20\_mot = T20\_set - T20\_actual$$

the signs + (positive) and − (negative) are herein selected merely by convention to indicate the corrective effect of the feedback branch 42.

As illustrated in FIG. 3, a top loop local controller 43, preferably distinct from the low loop local controller 33, translates the top loop actuation setpoint T20_mot into a current setpoint applied to the auxiliary motor 21.

Preferably, the top loop local controller 43 uses, to this end, a law or a map which may also depend on parameters «data» related to the vehicle, such as the longitudinal speed, the lateral acceleration, the yaw speed, etc., and/or parameters «data» specific to the power steering system 1, and more particularly parameters specific to the upper-level subsystem 20, 40, such as the rotational speed of the auxiliary motor 21, the torque generated by said auxiliary motor 21, the inertial mass of all or part of the components of the upper-level mechanism 20, etc.

Preferably, the top local loop 40 comprises a sub-branch 41A of the top loop input branch 41 which introduces a top loop input reference T20_ref which represents an input torque setpoint with a zero value, so as to be able to servo-control the top local loop at zero torque.

Hence, herein, we have: T20_ref=0.

As previously indicated with reference to the lower-level mechanism 10 which provided for a servo-control at zero force, the servo-control at zero torque of the upper-level mechanism 20 allows rendering said upper-level mechanism 20 transparent, and improving the responsiveness and the sensitivity thereof.

Herein again, the servo-control at zero torque enables the upper-level mechanism 20 to oppose no parasitic resistance to the maneuver of the steering wheel 22 by the driver, while faithfully restituting in said steering wheel 22 the reactions of the road and of the lower-level mechanism 10.

It should be highlighted that a power steering system 1 architecture comprising, on the one hand, a low local loop 30 intended to servo-control the lower-level mechanism 10 mechanically acting on the orientation of the wheels and, on the other hand, a separate top local loop 40, intended to servo-control the upper-level mechanism 20 which enables the driver to pilot and feel the maneuvers of the vehicle, is particularly adapted to a steer-by-wire system 1.

Preferably, as shown in FIG. 3, the power steering system 1 comprises a controller, called «global controller», 50 which separately generates, according to parameters representative of the condition of the upper-level mechanism 20 and of the condition of the lower-level mechanism 10, on the one hand a dynamic component of the low loop force setpoint F10_fyn, applied to the low local loop 30 and, on the other hand, a dynamic component of the top loop torque setpoint T20_dyn, applied to the top local loop 40.

The dynamic components of the force setpoint F10_dyn, respectively of the torque setpoint T20_dyn, are adjusted in real-time so as to adapt the reactions of the power steering system 1 to the service life condition of the vehicle at the considered time and to the actions (controls) of the driver at said considered time, and thus manage the steering assistance according to predetermined assist laws, which may for example be stored in charts within the global controller 50.

In the case of a steer-by-wire type power steering system 1, the global controller advantageously ensures the virtual coupling, by electric signals, between the top local loop 40 associated to the upper-level mechanism 20 and the low local loop 30 associated to the lower-level mechanism 10.

Amongst the parameters (specific to the power steering system 1) representative of the condition of the upper-level mechanism 20 and used by the global controller 50, it is possible to consider in particular the angular position $\theta_{22}$ of the steering wheel 22, and/or the angular speed $\dot{\theta}_{22}$ of said steering wheel.

Amongst the parameters (specific to the power steering system 1) representative of the condition of the lower-level mechanism 10 and used by the global controller 50, it is possible to consider in particular the angular position $\theta_{11}$ of the shaft of the assist motor 11, and/or the angular speed $\dot{\theta}_{11}$ of said assist motor.

Furthermore, the global controller 50 may also consider parameters «data» related to the vehicle (and external to the power steering system 1), such as the longitudinal speed, the lateral acceleration, the yaw speed, etc.

For example, the global controller 50 may determine a basic setpoint T_basic from all or part of these different parameters.

As a (non-limiting) example, the global controller 50 may determine a basic setpoint T_basic using a calculation law which, in practice, corresponds to a virtual torsion bar:

$$T_{basic}=k1*\Delta\theta+k2*\Delta\dot{\theta}$$

Where:

$$\Delta\theta=\theta_{22}-\theta_{11}$$

k1 is a gain homogeneous with a (torsional) elastic stiffness, $$\Delta\dot{\theta}=\dot{\theta}_{22}-\dot{\theta}_{11}$$

k2 is a gain homogeneous with a viscosity, such that the first term $k1*\Delta\theta$ corresponds to a torsional elastic deformation torque component, whereas the second term $k2*\Delta\dot{\theta}$ corresponds to dissipation torque component.

Nevertheless, regardless of the law used to calculate the basic setpoint T_basic, said basic setpoint T_basic is preferably converted, respectively by a first sub-controller 51 and by a second sub-controller 52, respectively into the low loop force setpoint dynamic component F10_dyn and the top loop torque setpoint dynamic component T20_dyn.

Thus, the global controller 50 forms a common core which branches out at the level of the sub-controllers 51, 52 so as to distribute the dynamic setpoints F10_dyn, T20_dyn to each of the top 40 and low 30 local loops.

Hence, in fine, the power steering system 1, and more particularly the steer-by-wire system 1, preferably has an architecture which comprises two (closed) local loops 30, 40 (namely a force servo-control low local loop 30 dedicated to the lower-level mechanism 10 actuating the wheels 12 and a torque servo-control top local loop 40 dedicated to the upper-level mechanism 20 acting on the steering wheel 22), said local loops 30, 40 being coupled to one another, and controlled, by the (same) global controller 50 (which defines the torque T20_dyn and force F10_dyn dynamic setpoints applicable respectively by each of these local loops 30, 40).

Advantageously, the power steering system 1 according to the invention allows, in particular, making a steer-by-wire by associating, through (preferably only through) the global controller 50, a lower subsystem 10, 30 and an upper subsystem 20, 40 distinct from one another and each capable of regulating itself in effort (respectively in torque), independently of one another.

More particularly, the invention concerns a steer-by-wire power steering system 1 comprising a lower-level mechanism 10 which comprises an assist motor 11 as well as a steered wheel 12, and an upper-level mechanism 20 which comprises a steering wheel 22 as well as an auxiliary motor 21, the lower-level mechanism 10 being servo-controlled on closed loop, at zero force, by a low local loop 30 comprising a feedback branch 32 which measures or estimates an actual downstream force F10_actual downstream of the assist motor 11 and upstream of the contact 12C of the wheel 12 with the ground 2, so as to render the assist motor 11 transparent, whereas the upper-level mechanism 20 is servo-controlled in closed loop, at zero torque, by a top local loop 40 comprising a feedback branch 42 which measures or estimates an actual driver torque T20_actual between the auxiliary motor 21 and the steering wheel 22 so as to render the auxiliary motor 21 transparent, the low 30 and top 40 local loops being preferably controlled by the same global controller 50.

Preferably, as mentioned hereinabove, each torque T20_dyn and force F10_dyn dynamic component completes, by means of a second input sub-branch 31B, 41B of the concerned local loop 30, 40, the input reference F10_ref, T20_ref supplied by the first input sub-branch 31A, 41A (distinct from the second input sub-branch 31B, 41B).

Thus, it is possible to take into consideration both the zero reference F10_ref, T20_ref, which enables a servo-control at zero force/torque, and the dynamic component F10_dyn, T20_dyn which reflects the active piloting of the steering system 1 (either by the driver, or by an automatic piloting system providing drive assistance).

Thus, preferably, the low loop input force setpoint F10_set results from the algebraic sum of the low loop input reference F10_ref, which is representative of a zero force, and of the low loop force setpoint dynamic component F10_dyn which originates from the global controller 50, 51.

Preferably, as illustrated in FIG. 3, the low loop input force setpoint F10_set results from the algebraic sum of the low loop input reference F10_ref, which is representative of a zero force, and of the low loop force setpoint dynamic component F10_dyn which originates from the global controller 50, 51.

To this end, it is possible to combine the first input sub-branch 31A and the second input sub-branch 31B by means of a summer block.

Preferably, said summer block may also receive the actual downstream force value F10_actual originating from the feedback branch 32, and which will be subtracted (in accordance with the used sign convention) from the input force setpoint F10_set so as to form the low loop actuation setpoint F10_mot.

In should be noted that, in the absence of a low loop force setpoint dynamic component F10_dyn, or if said dynamic component F10_dyn is zero, then the low local loop 30 servo-controls the lower-level mechanism 10 to the input reference value F10_ref, herein preferably F10_ref=0.

Alternatively to or complementarily with the aforementioned mode of calculation of the low loop input force setpoint F10_set, the top loop input torque setpoint T20_set preferably results from the combination of the top loop input reference T20_ref, which is representative of a zero torque, and of the top loop torque setpoint dynamic component T20_dyn which originates from the global controller 50, 52.

More preferably, the top loop input torque setpoint T20_set results from the algebraic sum of the top loop input reference T20_ref, which is representative of a zero torque, and of the top loop torque setpoint dynamic component T20_dyn which originates from the global controller 50, 52.

In a manner similar to what has been described regarding the low local loop 30, herein again, at the level of the top local loop 40, it is possible to use a summer to join the two input sub-branches 41A, 41B, and the feedback loop 42.

According to a preferred possibility of the invention, the actual downstream force F10_actual measured or estimated at the low loop reference point P10 is also used, outside the low local loop 30, by means of a function, called «feed forward» 60, as a component for determining the top loop input force setpoint T20_set and/or, in an equivalent manner, as a component for determining or adjusting the top loop actuation setpoint T20_mot intended to be applied to the auxiliary motor 21.

This «feed forward» function 60 is distinct from the low loop feedback loop 32, and from the top loop feedback loop 42, and is represented in dotted line in FIG. 3.

Advantageously, this feed forward function 60 allows transmitting directly from the lower-level mechanism 10 up to the top local loop 40, and more particularly up to the auxiliary motor 21, road feelings caused by variations of the external force F_ext that is exerted on the wheels 12 and on the lower-level mechanism 10, and which are felt at the level of the low loop reference point P10, and more particularly which are perceived by the force sensor 17.

The «road feeling», restituted by the reactions of the auxiliary motor 21 by the effect of the setpoint adjustment caused by the «feed forward» function 60, can thus be improved.

According to a possible application, the feed forward function 60 may be configured so as not to let a predetermined frequency range pass, in order to accentuate the feeling of the reactions that fall within this frequency range.

To this end, for example, it is possible to use a bandpass filter with an amplification gain over said frequency range.

Thus, assuming that we would consider that the set formed by the upper-level mechanism 20, the top local loop 40, the lower-level mechanism 10 and the low local loop 30 does not intrinsically have sufficient dynamic performances to restitute, in a fully satisfactory manner, within a given frequency range, the interactions between the wheel 12 and the ground 2, then it would be possible to use the feed-forward function 60 to amplify, within this frequency range, the signals generated by the interactions between the wheel 12 and the ground, in order to improve the feeling at the steering wheel.

Thus, the feed-forward function 60 allows setting the road feeling even more finely.

According to another possible application, alternative to or complementary with the previous one, it is possible to use a feed-forward function 60 configured to selectively attenuate, or cancel, the frequency feeling within a given frequency range.

To this end, it is possible to inject, thanks to the feed-forward function 60, a signal whose frequency is identical to the frequency of the perceived signal that shall be neutralized but which in phase opposition (shifted by 180 degrees) with respect to said perceived signal.

As example, it is thus possible to limit the felt effects of an imbalance phenomenon related to a balancing defect of a wheel 12.

In any case, the feed-forward function 60 will therefore offer a possibility of an additional fine setting.

That being so, in the case where the set formed by the upper-level mechanism 20, the top local loop 40, the lower-level mechanism 10 and the low local loop 30 has sufficiently high dynamics, resorting to the feed-forward function 60 is not necessary.

Moreover, the actual downstream force F10_actual is preferably measured, at the low loop reference point P10, with a bandwidth which extends (from 0 Hz) at least up to 20 Hz, at least up to 25 Hz, at least up to 30 Hz, and even beyond 30 Hz.

Thus, the force sensor 17 will produce a useful signal with a very rich frequency content, which will therefore contain a lot of information, particularly accurate, about the variations of the external force F_ext and therefore about the state of the interaction between the ground 2 and the wheel 12.

Of course, the low loop feedback branch 32 will be capable of conveying said signal with a bandwidth that is at least equal, in order not to lose frequency information.

Advantageously, a broad bandwidth confers a high tactile sensitivity on the power steering system 1, to the extent that regardless of the frequency, even when the latter is high, disturbances and variations of the external force F_ext caused by the action of the road coating (the ground 2) on the tire (and therefore on the wheel 12 and the lower-level mechanism 10), said disturbances and variations are immediately noticeable as such, and retransmitted to the steering wheel (by the global control 50 and/or by the feed forward function 60, then by the top local loop 40 and the upper-level mechanism 20), which provides the driver with a very fine feeling of the road; and that, in contrast, in particular with what happens in the case of a servo-control in position that would filter the disturbances in order to hold a stable steering position.

Of course, all of the controllers 50, 51, 52, 33, 43, and more generally the servo-control structures of the local loops 30, 40, may be implemented by any suitable electronic and/or computer calculators.

Moreover, the invention covers, as such, a vehicle, in particular a motor vehicle, equipped with a power steering system 1 as described in the foregoing.

Incidentally, the invention is not limited only to the aforementioned variants, those skilled in the art being in particular capable of freely isolating or combining together either one of the features described in the foregoing, or substitute them with equivalents.

The invention claimed is:

1. A power steering system comprising a first mechanism, called «lower-level mechanism», which comprises an assist motor as well as a steered wheel on which the assist motor acts to orient said steered wheel in yaw, said lower-level mechanism thus defining a lower-level kinematic chain which extends from the assist motor up to a portion of the steered wheel, called «contact portion», intended to come into contact with the ground, so that the forces and the movements originating from the assist motor are transmitted to the steered wheel via and along said lower-level kinematic chain, said power steering system also comprising a second mechanism, called «upper-level mechanism», which comprises a steering wheel and which is either free of any mechanical coupling with the lower-level mechanism, so as to form an upper-level kinematic chain that is separate from the lower-level kinematic chain, or mechanically coupled to the lower-level mechanism via a coupling member, so as to form, from the steering wheel up to said coupling member, an auxiliary upper-level kinematic chain which forms a bifurcation with respect to the lower-level kinematic chain, the power steering system wherein the lower-level mechanism is servo-controlled in force by a closed loop, called «low local loop», which comprises an input branch, called «low loop input branch», allowing defining an input force setpoint, called «low loop input force setpoint», a feedback branch, called «low loop feedback branch», which measures or which estimates, at a reference point, called «low loop reference point», located on the lower-lever kinematic chain, and outside the upper-level kinematic chain, downstream of the assist motor and upstream of the contact portion of the steered wheel, a force, called «actual downstream force», which is representative, at said reference point, of the force that is transmitted between the assist motor and the steered wheel by the lower-level kinematic chain, and in that said low loop feedback branch then applies said actual downstream force in feedback on the low loop input force setpoint, to form a low loop actuation setpoint, which is applied to the assist motor, so that the actual downstream feedback force automatically follows the low loop input force setpoint.

2. The power steering system according to claim 1, wherein the low local loop comprises a sub-branch of the low loop input branch which introduces a low loop input reference which represents an input force setpoint with a zero value, so as to be able to servo-control the low local loop at zero force.

3. The power steering system according to claim 1, wherein the lower-level kinematic chain comprises a rack driven by the assist motor, and at least one end of which is coupled to a steering tie-rod which, in turn, transmits the forces and displacements to the steered wheel, and in that the low loop reference point, at which the actual downstream force is measured or estimated, is located downstream of the rack in the direction of said steered wheel, at the junction between the end of the rack and the steering tie-rod, on the steering tie-rod, or downstream of the steering tie-rod.

4. The power steering system according to claim 1, wherein the lower-level kinematic chain comprises a steering knuckle which carries the steered wheel and which materializes the axis of orientation of said steered wheel, and in that the low loop reference point, at which the actual downstream force is measured or estimated, is located on said steering knuckle.

5. The power steering system according to claim 1, wherein the power steering system forms a «steer-by-wire» configured power steering system, free of any mechanical coupling between the upper-level mechanism and the lower-level mechanism.

6. The power steering system according to claim 1, wherein the upper-level mechanism comprises, in addition to the steering wheel, an auxiliary motor which is distinct from the assist motor of the lower-level mechanism, and in that said upper-level mechanism is servo-controlled in torque by a closed loop, called «top local loop», which comprises an input branch, called «top loop input branch», allowing defining an input torque setpoint, called «top loop input torque setpoint», as well as a feedback branch, called «top loop feedback branch», which measures or which estimates, at a reference point, called «top loop reference point», located between the auxiliary motor and the steering wheel, a torque, called «actual driver torque», which is representative, at said reference point, of the torque exerted by the driver, via the steering wheel, on the upper-level mechanism, and in that said top loop feedback branch then applies said actual driver torque in feedback on the top loop input force setpoint, so as to form a top loop actuation setpoint which is applied to the auxiliary motor so that the actual driver torque automatically follows the top loop input torque setpoint.

7. The power steering system according to claim 6, wherein the top local loop comprises a sub-branch of the top loop input branch which introduces a top loop input reference which represents an input torque setpoint with a zero value, so as to be able to servo-control the top local loop at zero torque.

8. The power steering system according to claim 6, further comprising a controller, called «global controller», which separately generates, according to parameters representative of the condition of the upper-level mechanism and of the condition of the lower-level mechanism, on the one hand, a dynamic component of the low loop force setpoint, applied to the low local loop and, on the other hand, a dynamic component of the top loop torque setpoint, applied to the top local loop.

9. The power steering system according to claim 2, wherein the low loop input force setpoint results from the combination of the low loop input reference, which is representative of a zero force, and of the dynamic component of the low loop force setpoint which originates from the global controller.

10. The power steering system according to claim 7, wherein the top loop input torque setpoint results from the combination of the top loop input reference, which is representative of a zero torque, and of the dynamic component of the top loop torque setpoint originating from the global controller.

11. The power steering system according to claim 6, wherein the actual downstream force measured or estimated at the low loop reference point is also used, outside the low local loop, by means of a function, called «feed forward», as a component for determining the top loop input force setpoint or as a component for determining or adjusting the top loop actuation setpoint intended to be applied to the auxiliary motor.

12. The power steering system according to claim 1, wherein the actual downstream force is measured, at the low loop reference point, with a bandwidth which extends at least up to 20 Hz.

* * * * *